United States Patent [19]

Micek

[11] Patent Number: 5,143,255
[45] Date of Patent: Sep. 1, 1992

[54] HOT MELT ADHESIVE CONTAINER FOR USE WITH HEATED PLATEN DISPENSING EQUIPMENT

[75] Inventor: Lawrence L. Micek, Stillwater, Minn.

[73] Assignee: H. B. Fuller Company, St. Paul, Minn.

[21] Appl. No.: 608,988

[22] Filed: Nov. 2, 1990

[51] Int. Cl.⁵ .............................................. B67D 5/60
[52] U.S. Cl. ........................................ 222/1; 222/143; 222/146.5; 222/386
[58] Field of Search ................ 222/1, 129, 143, 146.5, 222/326, 386; 285/373, 419, 901

[56] References Cited

U.S. PATENT DOCUMENTS

| | | | |
|---|---|---|---|
| 2,373,774 | 4/1943 | Murnane | 222/326 X |
| 3,412,903 | 11/1968 | van Riper, Jr. | 222/146.5 |
| 4,715,626 | 12/1987 | Gehring et al. | 285/373 X |

FOREIGN PATENT DOCUMENTS 2049623 12/1980 United Kingdom ................ 222/143

Primary Examiner—Michael S. Huppert
Assistant Examiner—Joseph A. Kaufman
Attorney, Agent, or Firm—Merchant, Gould, Smith, Edell, Welter & Schmidt

[57] ABSTRACT

The invention relates to containers for hot melt adhesives containing isocyanate compounds and to such containers used with heated platen dispensing equipment for the hot melt. More particularly, the invention relates to containers and dispensers for isocyanate containing adhesives that can dispense the adhesive to a use locus without generating toxic concentrations of isocyanate compounds in the environment around the dispenser. The isocyanate compounds are sealed within the containers during dispensing, preventing the generation of a toxic concentration of isocyanate in the environment or the atmosphere during dispensing operations.

5 Claims, 1 Drawing Sheet

HOT MELT ADHESIVE CONTAINER FOR USE WITH HEATED PLATEN DISPENSING EQUIPMENT

Field of the Invention

The invention relates to heated platen dispenser equipment and adhesive containers that can be used to dispense hot melt adhesives containing urethane compounds. The invention also relates to containers that can be used in cooperation with heated platen dispensing equipment, which cooperate with the heated platen to maintain the environmental concentration of isocyanate compounds at less than a toxic level during dispensing operations. The container's sealing means and platen cooperate to seal the dispensing equipment and containers as a unit from release of volatile isocyanate compounds generated during the heating, melting and dispensing of isocyanate hot melts.

BACKGROUND OF THE INVENTION

Hot melt adhesives containing isocyanate compounds have been common in a variety of adhesives used in construction applications for many years. Thermal curing and moisture curing isocyanate containing adhesives have been used in laminate construction, automobile construction, appliance construction, etc., in bonding such materials as woods, plastics, metals, composites, paper, paper board, film, etc. The major benefit of the use of isocyanate containing hot melt adhesives is the mechanical stability of the cured adhesive bond. Such bonds are formed by chain extension and cross-linking caused by the reaction between the active isocyanate groups and reactive adhesive components. A large number of types of isocyanate containing hot melt adhesives are known. Such adhesives can either contain free isocyanate compounds or can contain isocyanate compound bonded in preformed materials such as isocyanate terminated pre-polymers.

In the dispensing and application of molten hot melt adhesive to a use locus, the adhesive is commonly heated to an elevated temperature sufficient to cause the adhesive to melt and to attain a viscosity compatible with dispensing in common hot melt dispensing equipment. Temperatures ranging from at least 150° F. up to 325° F. are common. Such temperatures cause the adhesive, once applied, to develop a bond rapidly, often within 100-200 seconds. Most commonly, hot melt isocyanate containing adhesives are used with heated platen melters that dispense the adhesive from cylindrical containers such as five gallon pails, ten gallon fiber board containers, fifty-five gallon drums, etc. Currently this equipment consists of an apparatus which extrudes the adhesive from the pail. A heated platen contacts adhesive in the pail, heats the surface of the adhesive until molten, wherein a hose installed in the platen removes the heated molten adhesive to an extruder nozzle which applies the adhesive to a use locus. Current manufacturers of heated platen type isocyanate dispensing equipment are Nordson, model number 506, and Mercer, model number 1030 HS.

In the use of such dispensing equipment a heated platen is inserted into the open top of a pail. Since such pails have sealed bottoms, the heated platen effectively dispenses the contents of the container to within approximately one inch from the bottom of the containers to the use locus. However, when the heated platen is removed from the pail, large proportions of isocyanate compounds can be released into the atmosphere. The atmospheric isocyanate compound is released as a vapor, aerosol or particulate that can contact workers' skin surface and can be breathed. In addition, a "plug" of adhesive is left at the bottom of the container. Landfill regulations in many States require that this isocyanate containing adhesive be disposed of as hazardous waste.

Breathing air in which isocyanate exceeds the threshold limit values as established by the American Conference of Governmental Industrial Hygienist can cause respiratory distress. Skin or eye contact with uncured materials can also result in adverse reactions. The risk of exposure to excess levels of isocyanate is particularly high when a pail or drum has been emptied and must be changed. Therefore, the use of standard containers and heated platen equipment must be done in a controlled environment, wherein the atmosphere is rapidly exchanged or workers are otherwise protected from contact with isocyanate vapors, aerosols or particulates.

Because of the toxic nature of isocyanate vapors, fumes or particulates, a substantial need has existed for many years to develop a system for dispensing isocyanate containing hot melt adhesives that permit the efficient melting and unloading of containers filled with these adhesives and application of these adhesives to the use locus, without generating toxic concentrations of the isocyanate material within the air. Currently, a concentration of 20 parts per billion (ppb) isocyanate in the air is considered to be the maximum allowable concentration in common industrial environments. These limits apply to 4,4'-diphenyl methane diisocyanate, the most commonly used isocyanate in isocyanate containing hot melts. To the best of our knowledge, no commercially successful container or dispensing equipment has been developed in the prior art which can substantially eliminate toxic concentrations of isocyanate in the work place.

SUMMARY OF THE INVENTION

The invention relates to a container having a container body, with an open top end and an open bottom end, adapted for use with heated platen extruding equipment. The adhesive container with a full charge of adhesive is sealed with a top lid and a bottom lid covering the open ends, and protecting the adhesive from the environment. The top lid and bottom lid effectively contain the adhesive within the container for production storage, transportation, and storage at the end use.

The adhesive container is configured such that the heated platen can be inserted into the open top of the container with the first lid removed. The heated platen sealingly engages the adhesive surface and the inside diameter of the walls of the adhesive container body, preventing release of substantial quantities of free isocyanate into the atmosphere surrounding the platen and container. As the heated surface of the platen contacts the adhesive, the adhesive is melted and withdrawn from the container and the platen continues to travel through the container while continuing to seal the periphery of the platen to the interior diameter of the walls of the container. After a substantial portion of the adhesive has been dispensed from the container, a second container can be readied for dispensing by removing its lid from the first open end. The seal or lid on the second open end of the first container is removed and the second open end of the first container is sealingly joined to the first open end of the second container using a sealing means after the lid is removed from the second container. The heated platen can then travel in an uninterrupted fashion through the first container, consuming the entire charge of adhesive and can pass into the second container heating and dispensing the charge of adhesive from the second container. The first container is removed from the platen dispenser. Throughout the operation, the molten volatile isocyanate compound in the first container is prevented from escape through the presence of the solid, unmelted remaining portion of isocyanate containing adhesive in the first container. The second container is then sealingly attached to the first container and the platen can continue through the adhesive in the first container into the second container without exposing the heated molten isocyanate or heated surfaces of the platen to the atmosphere, thus preventing substantial release of the toxic concentration isocyanate compound.

The first aspect of the invention comprises an adhesive container having a first container body with a full charge of adhesive within the container body having a first open end and second open end covered by lids sealingly engaged to the periphery of the open ends.

A second aspect of the invention comprises dispensing equipment having a heated platen, wherein the heated platen is inserted into the open end of the first container body for the purpose of heating, melting and dispensing isocyanate containing hot melt adhesive. The first container body is attached to the second container body at a junction between the second open end of the first body and the first open end of the second body, wherein the sealed junction is maintained by an attachment means comprising a collar having a hinged portion and a locking portion, wherein the collar sealingly engages container body one to container body two, resulting in the passage of the platen from the first container body to the second container body without release of toxic isocyanate.

A third aspect of the invention comprises a method of dispensing hot melt isocyanate containing adhesive, using the dispenser discussed above, wherein the contents of a number of containers can be sequentially dispensed by the dispensing equipment and wherein the platen effectively melts and passes through the series of containers without substantial release of a toxic concentration of isocyanate. This process may be repeated, thereby allowing continuous use of adhesive.

DETAILED DISCUSSION OF THE INVENTION

Figure 1:
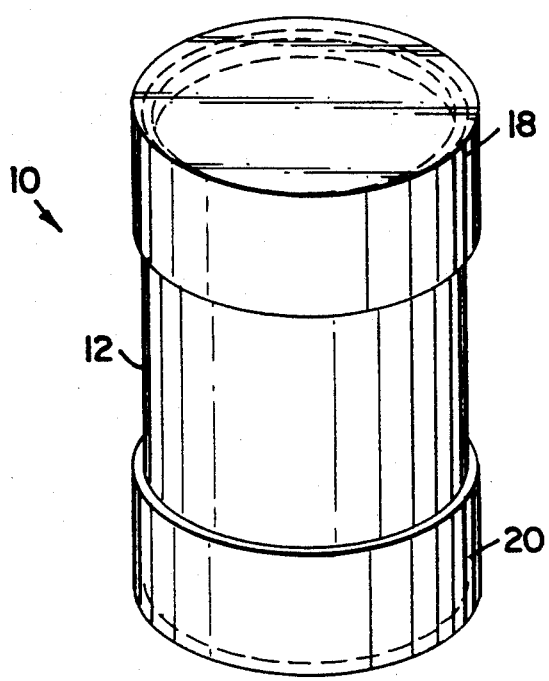
FIG. 1 is a perspective view of a preferred container of the invention, containing a cylindrical body and lids on the first and second open ends of the container body.

The heated platen dispensing equipment of the invention comprises a platen, typically a heated metal surface, that can be brought into contact with the hot melt adhesive mass. The platens generally are configured to take the shape of the adhesive container and are preferably circular, in view of the commonly used circular cylindrical format for adhesive containers that range in size from five to fifty-five gallons. The heated platens are mounted in a frame and are vertically positioned above a support for the cylindrical adhesive container. The platen is then mechanically lowered onto the surface of the hot melt adhesive held within the container. The adhesive is heated, melted and then the platen is mechanically driven through the adhesive as it melts. The molten adhesive is withdrawn from the container through a hose or other heated conduit and is generally pumped mechanically to a dispensing nozzle or orifice that is commonly valved to permit the unit to be controlled with intermittent application of the molten adhesive to a bond or use locus. Such equipment typically contains means to control the pressure and flow of the adhesive and to maintain the temperature of the platen at an effective level causing the creation of molten adhesive. The temperature is controlled such that the adhesive does not deteriorate thermally during dispensing. The nozzle, orifice or dispensing end of the equipment can have a diameter sized to deliver the appropriate amount of adhesive to the use locus.

Upon delivery of the adhesive to the bond site or use locus, reactive polyurethane adhesives can cure through the production of urea or carbamate bonds (or other bonds) forming a rigid thermosetting structural joint. In moisture curing adhesives, using the reaction between the isocyanate groups atmospheric water, or water vapor, or humidity artificially produced, at or near the bond site to initiate the curing reaction, can be effectively used with the equipment of the invention.

The isocyanate containing adhesives of the invention can contain free mono, di, tri, tetra, etc. substituted isocyanate compounds in a free or combined state. Free isocyanate compounds are commonly contained in the adhesive, wherein the isocyanate compounds are not prereacted before application. Alternatively, the isocyanate compounds can be prereacted, for example, in the production of isocyanate end-capped prepolymers, and blended into the hot melt adhesives of the invention prior to application. Isocyanate compounds commonly used in the applications of the invention include diphenylmethane diisocyanate (MDI), toluene diisocyanate (TDI), isophorone diisocyanate (IPDI), tetramethylxylene diisocyanate compounds (TMXDI), meta-vinylbenzene isocyanate (m-TMI), etc. These compounds, in particular MDI are volatile at elevated temperatures and are considered toxic. Concentrations greater than 20 ppb in the atmosphere are considered to be harmful and are not acceptable to OSHA and other government agencies.

Such isocyanate containing adhesives can be packaged as either one part adhesives, wherein all reactive components are held within a single adhesive container or packaged in two parts, wherein the isocyanate compounds are packaged within a first contained part and the reactive compounds that participate in a curing reaction with the isocyanate compounds are contained in a second contained part.

The preferred adhesives for use in this invention are moisture curing one part isocyanate compounds, that when applied to a work piece react with water from the atmosphere or humidity created in the atmosphere in the vicinity of the bond line to initiate curing.

The adhesives of the invention can include a variety of other optional ingredients such as thermoplastics, polymers that are generally considered to be non-reactive with isocyanate prepolymers. Such thermoplastic polymers include polyethylene, polypropylene, ethylene vinyl acetate, ethylene acrylate, ethylene methacrylate, polyesters, polyamides, polystyrenes and other well known thermoplastic polymers that can have some structural capacity. Further, the invention can contain adhesive components such as plasticizers and tackifiers that are compatible with the isocyanate compound, the curing agent, any thermoplastic polymer or other adhesive component. The adhesive can also contain fillers, dyes and antioxidants and other common adhesive additive materials.

The container body used to package the adhesive can have any volume convenient for production and handling. Preferably the volume is at least one gallon, but may be as much as fifty-five gallons. Other convenient volumes can be five gallons, ten gallons, fifteen gallons, twenty gallons, etc.

The container of the invention can take any convenient shape, including box like, cylindrical, cylindrical with an oval cross-sectional shape, octangular cross-sectional, etc. The primary limitation on the configuration of the container body is that a platen passes through the container body from one open end to the second open end, while remaining sealingly engaged with the inside diameter of the periphery. The platen is commonly shaped to conform to the cross-sectional shape of the container and is generally circular. For this reason, the preferred shape of the container body is a regular cylinder having a diameter of about 6 to 30 inches, preferably 11 to 23 inches to fit the commonly available platen diameters. Commonly the cylindrical container bodies are 8 to 40 inches, preferably 13 to 34 inches in depth, in order to assure the that the filled containers are easily handled and can be conveniently attached to other containers held within the dispensing equipment.

The container bodies can be prepared from any material that is substantially non-reactable with isocyanate compounds and is stable with the temperatures attained with heated platens and hot melt adhesives. Containers can be prepared from paperboard, common metal container materials, reinforced thermosetting materials, ceramic materials, wood and bonded pressed wood shaped containers, etc. Preferred containers are manufactured from paperboard or corrugated paperboard for reasons of ease of handling, filling and dispensing.

The container materials can contain additional elements that increase the stability of the container during loading, storage, transportation, dispensing, and other operations. The container materials can contain an integral interlining of material adhered to or coated on the inside of the container. The inside surface of the container can contain a layer of material, such as wax, ethylene-vinyl acetate, teflon, silicone release liner or inorganic dusting materials, such as mica, calcium carbonate, calcium silicate, etc. Further, the container can contain or accommodate film inserts separating the adhesive from the container body. Such inserts can comprise polyester, polyethylene, metalized polyester, polyvinylidene chloride, polyvinylidene fluoride, teflon, etc.

The container body commonly has a first open end and a second open end, covered by a lid or other sealing means. The lid is commonly press-fit or frictionally attached to the open ends of the container. The lid fits over the open end and extends down the container body to form a seal. The lid commonly uses the same cross-sectional shape as the container body to insure a proper seal, protecting the adhesive from the environment and insuring that little or no effective concentration of adhesive component is released to the atmosphere. Underneath the lid, in contact with the open end and the exposed adhesive, the adhesive container can have an internal film barrier, permitting easy release of the lid from the adhesive. The lid can contain means for fixing the lid securely on the container until removal is desired. Such means include tear strips, pull-tabs, perforated joints, etc.

The first and second open end of the container is adapted for attachment to a second container body. The open ends can have edges that have tongue-in-groove or tenon-like projections that can aid and cooperate in forming an effective junction between the first and second container body. Once the first and second container body are placed in intimate contact, a sealing means is placed over the joint between the first and second bodies. Such sealing can include adhesive tape, poly shrink wrap, screw clamp, etc. In a preferred embodiment of the invention, wherein a cylindrical container body is used, the sealing means comprises a cylindrical collar having a hinged portion and a locking portion which holds the container bodies in a sealed configuration. Such collar sealingly engages the second open end and the first open end of the container bodies and maintains the contact between the first open end and the second open end during the thermally driven transfer of the contents of both bodies through the dispensing equipment to the bond locus.

DESCRIPTION OF THE PREFERRED EMBODIMENT

Referring to the drawings, wherein like numbers represent like parts throughout the several views, there is generally disclosed in FIG. 1 the container 10 for use with heated platen unloading equipment. The container 10 includes a container body 12. In the preferred embodiment, the body 12 is generally tubular or cylindrical. While it should be understood that many configurations, sizes and shapes of the body 12 can be envisioned within the scope of the invention, the preferred embodiment is configured to conform to the platen-type unloading equipment partially disclosed in FIG. 2. The equipment 14 includes a generally circular platen 16. The platen 16 is generally circular and, as will be discussed hereafter, sealingly fits within the container body 12 for use.

Figure 2:
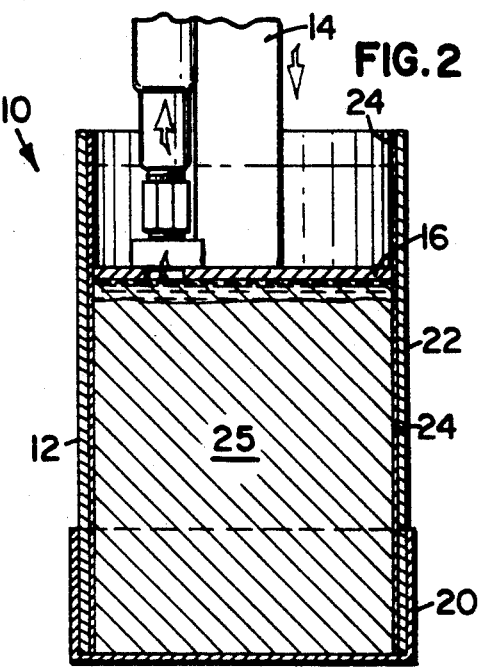
FIG. 2 is a cross-sectional view of the preferred container of the invention, illustrating the insertion of the heated platen into the interior of the container for dispensing the hot melt.
Figure 4:
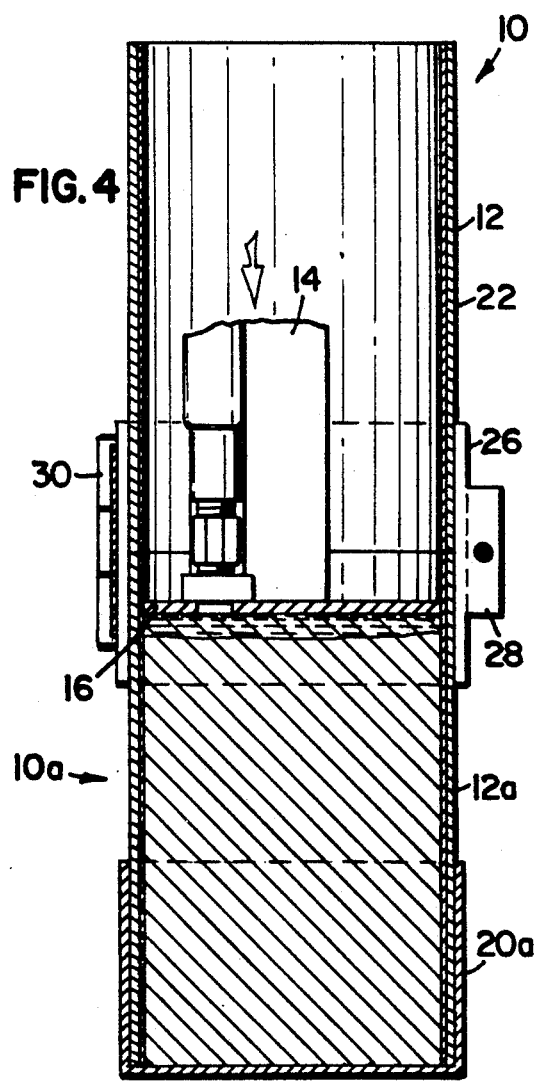
FIG. 4 is a cross-sectional view of the joined containers of the invention, illustrating a method of sequentially dispensing the contents of the first container body and the contents of the second container body without exposure of the heated platen to the atmosphere releasing toxic isocyanate compound.

The container 10 also includes a top lid 18 and a base lid 20. The lids 18 and 20 are sized and configured to sealingly engage the body 12. Therefore, the lids 18 and 20 are identical in the preferred embodiment. As shown in FIG. 1, the lids 18 and 20 enclose the body 12 and form a reservoir for the hot melt adhesive or other preferred substance 25. The lids 18 and 20 are configured to form a vapor proof seal with the body 12 In the preferred embodiment, the body 12 and lids 18 and 20 are made of a corrugate layer 22 having an inner lining 24 made of metalized mylar. As shown in FIGS. 2 and 4, the inner lining 24 is laminated to the corrugate layer 22. In an alternative embodiment, the inner lining 24 may be attached to the corrugate layer 22 proximate the top and bottom of the container 10 only. In this manner, the lining may conform to the shape of the adhesive. It is possible that the hot melt urethanes may shrink after a container is filled. Therefore, a gap may be formed between the inside wall of the container 10 and the hot melt urethane 25. In order to insure that no leakage occurs when the bottom lid 20 of the container is removed, this inner lining 24 may be used which is attached at the top and bottom of the container and deformable. This means of attachment will form a bladder that can contract with the moisture curing hot melt urethane 25 as it cools after the container is filled for use. Therefore, no gap may form between the "cold" adhesive and the lining 24 of the container 10. This bladder will prevent any possible leakage when the bottom lid 20 is removed for the changing of containers 10.

The materials utilized in the container 10 must have a low vapor transmission rate so as to properly contain and store the urethanes for which they are intended and to exclude moisture. As one skilled in the art knows, the materials for the container 10 may be metal, plastic, corrugate or any other suitable alternative.

The top lid 18 and bottom lid 20 remain in place on the body 12 during storage and transport. In use, the top lid 18 is removed from the container. The container 10 is placed in the heated platen unloading equipment 14 as shown in FIG. 2. The adhesive is in solid form until heated and no danger of isocyanate overexposure is present when cool. The platen 16 is positioned within the body 12 of the container 10. As stated above, the platen 16 fits snugly within the inner diameter of the body 12. In this manner, hazardous fumes are not released from the heated adhesive into the environment of the user. The platen-type equipment 14 may then be operated to melt and withdraw the adhesive melt 25 from the container 10.

As discussed above, the greatest danger of use of platen-type equipment 14 with substances which generate free isocyanate is at the point of changing and disposal of the container. The current practice and containers often create a head between the platen and the adhesive where isocyanate builds up. When the user removes the platen by taking it back through the body, he or she is exposed to this build up of isocyanate. This invention avoids this build up and allows the user to work with adhesives and sealants without hazardous exposure.

Figure 3:
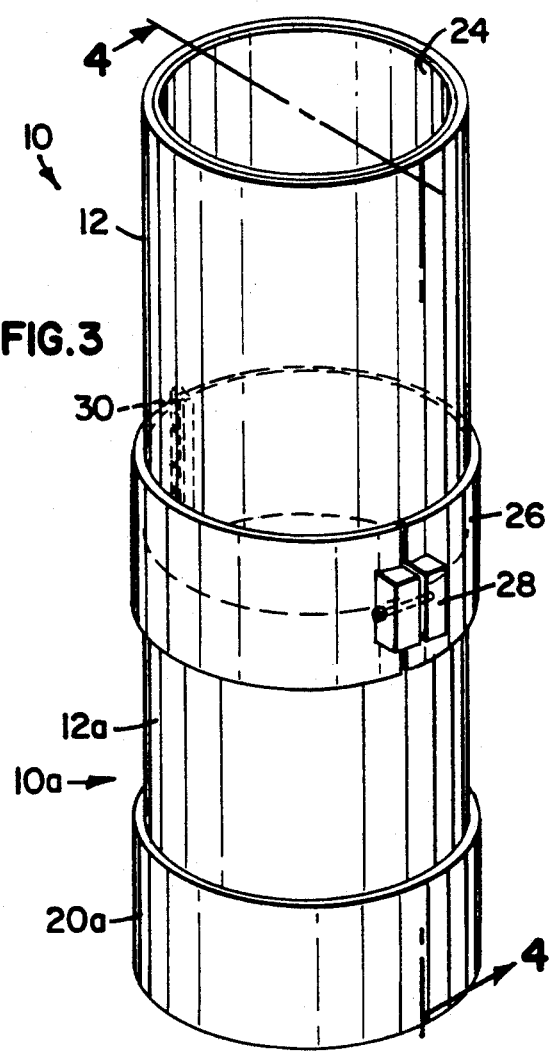
FIG. 3 is a perspective view of the joined containers of the invention, illustrating a first container body joined to a second container body, with the sealing collar positioned at the junction between the first container body and the second container body with a lid on the second container on the second open end.

Referring now to FIGS. 2, 3, and 4, the method of practicing the invention is disclosed. FIG. 2 illustrates the use of a container 10 where the top lid 18 has been removed. The operator has positioned the platen 16 and may now extrude the adhesive or sealant 25. When the level of adhesive 25 nears the bottom of the body 12, the user stops the extrusion process to change the container 10. The container 10 is raised and bottom lid 20 is removed from the body 12. The removal of the lid 20 does not cause any harmful contact by the user. The adhesive 25 is in a cool solid state when the lid 20 is removed. A second container 10a is positioned beneath the body 12 of the first container 10 after the top lid 18 has been removed. The container bodies 12 and 12a are axially aligned and the platen 16 remains in the body 12 of container 10. Once the first and second container body are placed in intimate abutting contact, a sealing means is placed over the seam between the first and second bodies.

As shown in FIG. 3, a collar 26 is utilized with the method of the invention. The collar 26 includes a closure 28 and a hinge 30 in the preferred embodiment. The collar 26 is placed around the bodies 12 and 12a of containers 10 and 10a at the seams so as to form a seal and control any seepage which would occur due to the changing of the containers. The collar 26 is configured to fit around the body 12 and 12a of the containers 10 and 10a. In the preferred embodiment, the hinge 30 allows the collar 26 to enclose the bodies 12 and 12a. The collar is then secured by closure 28 to form a seal. In the preferred embodiment, the collar 26 is made of steel. It should be understood by one skilled in the art that any other material or configuration of the collar 26 within the scope of the invention may be utilized.

Referring now to FIG. 4, the platen 16 is shown moving from container 10 to container 10a. The user engages the platen equipment 14 after the second container 10a is in place. Therefore, the plate 16 is able to move from container 10 to container 10a without exposing the user to harmful levels of free isocyanate and completely using the adhesive 24 in the first container. As shown, the platen 16 has moved past the body 12 and into the body 12a. The collar 26 prevents any seepage of the adhesive 24. The user may now remove the first container 10.

Removal of the container may be done by cutting the body 12 and peeling it away from the equipment 14. In the preferred embodiment, the container 10 is made of corrugated paperboard and it is convenient for the user to cut it away. However, any other suitable method of removal may be utilized. For example, a tear strip (not shown) may be incorporated into the body 12 of the container 10 to allow removal from the equipment 14. Also, in the case of a metal container, the body may be stamped along vertical strips and tabs are connected to the strips where pulling on the tab removes the strips to allow removal.

The method of the invention prevents over exposure of the user to hazardous isocyanate fumes or particulates. The user is never exposed to an open hot platen as in conventional methods. Further, the construction of the container does not allow build up of isocyanate fumes or seepage which is harmful to the user. It has been established that conventional methods may expose the user to levels from 0.0 ppb to greater than 40 ppb, far exceeding acceptable limits. As discussed above, the particular configuration, shape and combination of materials for the system can be varied to suit the particular application and equipment to insure that isocyanate exposure is well within the limits set by the Occupational Health and Safety Administration.

For example, a five gallon container of corrugate with a mylar film layer was tested in a no ventilation area. The container was filled with HL-9519 adhesive manufactured by H. B. Fuller of St. Paul, Minn. The platen equipment utilized was manufactured by Nordson and is designated as model number 506. The monitor used to test the isocyanate levels was the 925 Series MDI Aerosol/Vapor Autostop Portable Monitor, manufactured by GMD Systems, Inc. The monitor has an accuracy of ±15% of reading or 1 ppb, whichever is greater. The range of the monitor is 0 to 40 ppb. The platen temperature was 250° F. and the relative humidity was less than 50%. The flow rate was 800 cc/min.

and the sampling interval was 60 seconds. The results of the testing are shown below in Table I.

TABLE I

| MDI Emissions at Various Positions | |
|---|---|
| Position | Emission Levels (ppb) |
| 6 inches above platen | 0.0 |
| 2 feet horizontally from container (one container) | 0.0 |
| 2.5 feet above platen | 0.0 |
| 1.5 feet horizontally from container (one container) | 0.0 |
| 3 feet above platen | 0.0 |
| 1 foot horizontally from collar (platen at collar level, second container placed beneath first) | 1.0 |
| 3.5 feet above platen | 0.0 |
| 1 foot horizontally from collar (platen below collar, two containers) | 0.0 |
| 1 foot horizontally from platen (prior to attachment of collar to first container, exposed cold adhesive) | 4.0 |
| 1 foot horizontally from collar (platen below collar, two containers) | 0.0 |
| 1 foot horizontally from platen (hot platen removed from container to simulate conventional method) | >40.0 |
| 1.5 feet above platen (first container removed, collar in place, platen in second container) | 3.0 |

As shown, the level of isocyanate when utilizing the invention did not exceed OSHA limits and in fact, was well within the limits. The largest exposure utilizing the invention was measured during container changeover in the area of the bottom of the container at 4 parts per billion (ppb). The only measure exceeding acceptable limits was taken to simulate conventional methods, i.e., the heated platen was removed from the container, and levels measured greater than 40 ppb. The data shown in Table I establishes that the container and method of use are effective in controlling exposure to isocyanate.

While particular embodiments of the invention have been described, modifications of the invention will be apparent to those skilled in the art in light of the foregoing description. This description is intended to provide specific examples of certain embodiments which clearly and fully disclose the invention. Accordingly, the invention is not limited to the described embodiments or the use of the specific elements therein. All alternative modifications and variations of the present invention which follow in the spirit and broad scope of the appended claims are covered.

What is claimed:

1. A dispenser for a hot melt adhesive which dispenser comprises:
   (a) a first container body having a mass of hot melt isocyanate adhesive within the container, said container body having first and second open ends;
   (b) a second container body containing a mass of hot melt isocyanate adhesive, said second body having first and second open ends, wherein said second container abuts the first container body forming a seam;
   (c) a heated platen inserted into the first open end of the first container body, a cover sealing the second open end of the second container body; and
   (d) a means to seal the joint; wherein the heated platen melts the hot melt adhesive in contact with the platen and removes the liquid hot melt for dispensing and seals the containers to the release of toxic concentrations of isocyanate.

2. The container of claim 1, wherein the first and second container body are generally cylindrical, the platen generally is circular and has a diameter that sealingly engages the container bodies.

3. The dispenser of claim 1, wherein the sealing means comprises a hinged collar, having means to sealingly fix the joint at the joint between the first container body and the second container body.

4. The dispenser of claim 1, wherein the heated platen is connected to means to dispense the hot melt adhesive to a use locus.

5. A method for dispensing urethane to a use locus with heated platen dispensing equipment, said method comprises:
   (a) removing a first lid from a container of isocyanate containing adhesive, said container having a container body, a first open end, a second open end, and a lid on the first open end and the second open end;
   (b) contacting the heated platen with the hot melt urethane containing adhesive exposed at the first open end of the container;
   (c) dispensing the hot melt in liquid form through the heated platen;
   (d) ceasing dispensing of the hot melt in liquid form;
   (e) removing the second lid from the second open end of the container and placing the second open end in contact with a first open end of a second container body; and
   (f) sealing the interface between the first container body and the second container body using a hinged collar containing means to fix the collar around the interface, preventing release of a toxic concentration of isocyanate.

* * * * *

UNITED STATES PATENT AND TRADEMARK OFFICE
CERTIFICATE OF CORRECTION

PATENT NO. : 5,143,255
DATED : September 1, 1992
INVENTOR(S) : LAWRENCE L. MICEK It is certified that error appears in the above-identified patent and that said Letters Patent is hereby corrected as shown below:

On title page, item [73], "H. B. Fuller Company, St. Paul, Minn." read --H. B. Fuller Licensing & Financing Inc., Wilmington, Delaware--
    In column 5, line 44, for "assure the that" read --assure that--.
        In column 6, line 66, for "12 In" read --12. In--.
        In column 7, line 68, for "body" read --bodies--.
        In column 10, line 21, for "body" read --bodies--.

Signed and Sealed this

Fourteenth Day of September, 1993

Attest:

BRUCE LEHMAN

Attesting Officer     Commissioner of Patents and Trademarks